United States Patent Office 3,814,592
Patented June 4, 1974

3,814,592
METHOD OF SIZING GLASS FIBER STRAND AND ARTICLES PRODUCED THEREFROM
Donald E. McWilliams, 523 Central Ave. 15238; Charles W. Killmeyer, 1065 Ardmore Manor Drive 15221; and George E. Eilerman, 100 Richmond Drive 15237, all of Pittsburgh, Pa.
No Drawing. Application July 8, 1971, Ser. No. 160,932, which is a continuation-in-part of abandoned application Ser. No. 726,584, May 3, 1968. Divided and this application July 30, 1973, Ser. No. 383,876
Int. Cl. C03c 25/02; C08g 51/10
U.S. Cl. 65—3                                                   3 Claims

ABSTRACT OF THE DISCLOSURE

Nylon resin is reinforced with glass fiber strand which is sized during forming with a size composed of an aqueous, stable emulsion of a polyurethane resin, an amino silane, a textile lubricant and an emulsifying agent.

CROSS-REFERENCES TO RELATED APPLICATIONS

This is a division of application Ser. No. 160,932, filed July 8, 1971, which application is a continuation-in-part of application Ser. No. 726,584, filed May 3, 1968, now abandoned.

BACKGROUND OF THE INVENTION

The present invention is concerned with a polyamide resin reinforced with glass fiber strand and it particularly relates to a glass fiber strand which is especially prepared for reinforcement of nylon articles.

A glass fiber strand is composed of a multitude of fine glass filaments which are formed by being drawn at a high rate of speed from molten cones of glass located at the tips of small orifices in a bushing such as shown in U.S. Pat. No. 3,133,238. During formation, the filaments are coated while moving at a speed of the order of 5,000 to 20,000 feet per minute with a size which contains a binder to give the strand integrity for workability for any standard textile or reinforcement use. If the strand does not have proper integrity, fuzzing occurs during these operations and eventually the strand breaks. The size also contains a lubricant for the filaments to prevent destruction of the strand by abrasion of the individual filaments against each other or against fiber handling equipment.

It is common practice to use glass fiber strands and glass fiber cloth as a reinforcement for resins. For such use, the glass fibers are coated with a coupling agent or finish material which makes the surface of the glass fibers substantive and compatible with the particular resins with which they are to be employed. These coupling agents greatly increase the dry and wet physical strengths of the glass fiber resin laminate.

When the glass fibers are used in the form of strand, i.e., roving or chopped strand or twisted strand, for resin reinforcement, the coupling agent is usually combined with the size and applied with the size to the fibers during their formation. The size employed is usually an aqueous dispersion or emulsion of a film forming, synthetic binder, and a glass fiber lubricant. Roving is formed by combining a number of strands in parallel form and winding the strands on a tubular support in a manner such that the combined strands may be unwound and used to form woven roving or chopped strands. Twisted strand (single end on a bobbin) is made according to conventional textile twisting techniques by removing the strand from the forming package and winding it on a twister bobbin. It is therefore necessary that the strand have good integrity and resistance to fuzzing during the steps employed to make the twisted strand or roving and fabricate them into forms suitable for use as a resin reinforcement.

It is known that certain coupling agents provide superior flexural and compressive strength and flexural modulus properties to various glass fiber reinforced resins. For example, unsaturated silanes such as hydrolyzable vinyl silanes improve these properties between glass fibers and unsaturated polyester resins to a much greater degree than they improve these properties between glass fibers and epoxy resins. Amino silanes have proved to provide better properties to epoxy resins reinforced with glass fibers. There is some degree of predictability as to what size can be most useful on glass fibers which are to reinforce thermosetting resins which are reacted in situ with the glass fibers, since the functional group on the silane on the glass fibers is believed to enter into the reaction with the thermosetting resin. The same type of predictability as far as strength and modulus properties cannot be carried over to the selection of a size for a glass fiber strand which is to reinforce a polymerized, thermoplastic resin since the polymerization reaction has already taken place prior to the incorporation of the glass fiber strand into the resin.

A glass fiber strand for the thermoplastic resin reinforcement is subjected to high temperatures during mixing with the thermoplastic resin and/or during the forming and shaping of the reinforced resin. These temperatures are substantially higher than those encountered in the making of reinforced thermosetting resins such as reinforced polyester resins. At these high temperatures, discoloration of the thermoplastic resin sometimes occurs because of the thermal instability of the sizes presently used on glass fiber strands for resin reinforcement.

The sizes which perform well on glass fiber strands for reinforcement of one particular type of thermoplastic resin do not necessarily perform well with other types of thermoplastic resins.

An object of the present invention is the provision of a glass fiber strand which serves as a good reinforcement for polyamide resins, commonly called nylon. The strand must be capable of being formed efficiently, fabricated into roving and chopped strand without fuzzing, combined with nylon and formed by injection molding without breakdown, and heated at high temperatures without discoloring the nylon to provide a high strength reinforced nylon article.

INVENTION

In accordance with the present invention, nylon is successfully reinforced with glass fiber strand which has been sized during forming with an aqueous size consisting essentially of 3 to 9% by weight of a blocked curable, emulsified polyurethane, prepolymer resin, and 0.2 to 1.0% by weight of an amino silane. Approximately 1 to 4% by weight of an emulsifying agent and/or 0.1 to 1.0% by weight of a textile lubricant can also be present in the size.

The polyurethanes which are useful in the practice of the invention are curable, blocked, polyurethane resin emulsions. The emulsions are formed by dissolving the polyurethane prepolymer in a sufficient amount, i.e., about 20 to 50% by weight of a non-reactive organic solvent for the polyurethane based upon the weight of the solution and then gradually mixing the solution with sufficient water to form a stable emulsion of droplets of the solution in the water. The solvent can be a material such as alcohols, toluene, xylene, methyl and ethyl cellosolves, cellosolve acetate, ethyl acetate, butyl acetate, methyl isobutyl ketone, and the like. The emulsions are stable upon further dilution with water and are non-ionic.

The polyurethanes are formed by the reaction of a polyisocyanate such as tolylene diisocyanate adducts of hydroxyl terminated polyether or polyester resins with an end-blocking compound containing active hydrogen atoms, such as an amide or polyamide, according to conventional techniques developed for the production of polyurethane resins. The preferred end-blocking compound is caprolactam. A suitable procedure for producing such end-blocked polyurethane resins is set forth in U.S. Pat. No. 3,245,961.

The polyisocyanate is referred to as a prepolymer, i.e., an adduct of a simple diisocyanate with a suitable polyfunctional resin. The polyisocyanate adduct is reacted with a compound such as aliphatic amide to temporarily block the free isocyanate groups (—N=C=O) to form a thermally reversible polyurethane. Since the blocked isocyanate is unreactive with hydroxyl groups at room temperature, the blocked system can exist as an aqueous emulsion in the presence of a polyfunctional compound which would normally tend to react with the prepolymer. Such compounds are usually polyhydroxy compounds such as the polyester and polyethers which are originally reacted with the polyisocyanate to form the prepolymer. They may also be polyamines such as disclosed in U.S. Pat. No. 3,245,961. When heated, the water evaporates before the isocyanate becomes reactivated for reaction with the polyfunctional compound. The reaction takes place when the strand is dried on the forming package at temperatures on the order of 250 to 350° F. for 12 to 3 hours respectively.

Representative examples of polyisocyanates which are useful in the formation of the prepolymer include aromatic and aliphatic polyisocyanate compounds such as toluene diisocynaate, tetramethylene diisocyanate, pentamethylene diisocyanate, hexamethylene diisocyanate, propylene-1,2-diisocyanate, butylene - 1,2 - diisocyanate, and ethylene diisocyanate; the cycloalkylene compounds such as cyclopentylene-1,3 diisocyanate, cyclohexylene-1,3 diisocyanate; the aromatic compounds such as m-phenylene diisocyanate, p-phenylene diisocyanate, 4,4′-diphenyl diisocyanate, 1,5-naphthalene diisocyanate; 2,4-toluene diisocyanate, 2,6-toluene diisocyanate, toluene triisocyanate and 1,4-xylene diisocyanate.

The prepolymers may be prepared by reacting hydroxy polyesters and polyethers with a polyisocyanate, such as toluene diisocyanate, said prepolymer having an isocyanate hydroxy ratio of at least two equivalents to one equivalent so as to provide a prepolymer having terminal isocyanate groups. These prepolymers are then reacted with caprolactam to block the isocyanate groups. Exemplary of some typical polyols that can be reacted with polyisocyanates to form prepolymers which can be completely blocked with caprolactam include glycerine, castor oil, trimethylol ethane, trimethylol propane, etc. Other polyethers which can be utilized in forming the prepolymers which can be utilized in accordance with this invention include polyoxyethylene glycols having molecular weights of 200, 400, 600, 800, 1,000, 2,000 and 4,000; polyoxypropylene glycols having molecular weight of 400 to 4,000, such as the Pluracol P series of Wyandotte Chemical Corp.; and copolymers prepared by the sequential addition of ethylene oxide to polyoxypropylene glycols. The copolymers can be represented by the formula

HO(C₂H₄O)ₐ(C₃H₆O)ᵦ(C₂H₄O)ᵧH

The molecular weight of the base, i.e., the polyoxypropylene portion of the molecule can vary, e.g., from about 600 to 2,500. Hence, in these instances, each $b$ in the above formula can vary from about 10 to 43. The oxyethylene content can vary from, e.g., 10% to 20% by weight of the total. Exemplary of these materials having a molecular weight of between 800 and 1,000 for the base portion of the molecule, i.e., the polyoxypropylene portion, and from 10% to 20% by weight of the ethylene oxide in the molecule are materials having a molecular weight of between 2,101 and 2,500 and having from 10% to 20% by weight of ethylene oxide in the molecule. Other polyethers which may be utilized in this invention are the ethylene oxide and propylene oxide condensates of glycerine, 1,2,6-hexanetriol, trimethylol propane, pentaerythritol, etc.

The polyester resins which can be utilized to form prepolymers with isocyanate in accordance with this invention can be obtained by reacting one or more polyhydric alcohols having at least two hydroxyl groups with one or more dibasic acids or their anhydrides. Exemplary of the polyhydric alcohols which can be used in producing the polyesters are ethylene glycol, diethylene glycol, trimethylol propane, trimethylol ethane, glycerol, pentaerythritol, sorbitol, mannitol, etc., and mixtures of the above. Of course, when a diol is used, there may be present some amount of triol, tetrol, or other polyhydric alcohol having a functionality greater than two in order to incorporate branching into the polyester. Exemplary of the dibasic acid and anhydrides which can be used in the production of the polyester resin are malonic acid, oxalic acid, adipic acid, sebacic acid, azelaic acid, itaconic acid, succinic acid, terephthalic acid, isophthalic acid, phthalic anhydride, maleic anhydride, etc., and their mixtures.

Amino silanes which are contemplated for use in the present invention include those illustrated by the following structural formula:

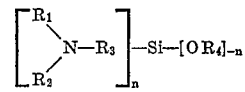

wherein $R_1$ is H, an alkyl radical containing from 1 to 5 carbon atoms or $HNHCH_2—(CH_2)_x—$, $x$ being from 1 to 5, $R_2$ is H or an alkyl or acyl radical containing from 1 to 5 carbon atoms, $R_3$ and $R_4$ are alkyl radicals, preferably containing 1 to 5 carbon atoms, or substituted alkyl radicals, and $n$ is a whole number from 1 to 3, preferably 1. Typical examples of these amino-alkyl alkoxy silanes include gamma-amino-propyl triethoxysilane and similar silanes produced in the manner described in U.S. Patent Specification No. 2,832,754.

Other amino-alkyl alkoxy silanes which may be used are represented by the following structural formula:

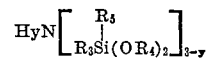

wherein $y$ is 0, 1 or 2, $R_3$ and $R_4$ are alkyl radicals, preferably containing from 1 to 5 carbon atoms, and $R_5$ is an alkyl or aryl radical. Typical examples of these silanes include gamma-aminopropylmethyl-diethoxysilane, delta-aminobutyl-methyldiethoxysilane and similar silanes produced in the manner described in U.S. Patent Specification No. 2,930,809. Moreover, polymers produced from the hydrolysis products of these amino-alkyl alkoxy silanes may also be employed in place of, or in addition to the amino-alkyl alkoxy silanes and, or hydrolysis products of the amino-alkyl alkoxy silanes, said polymers being formed of the hydrolysis products of the amino-alkyl alkoxy silanes as set forth in U.S. Patent Specification No. 3,045,036.

Although commercially available polyurethane emulsions are stable for most purposes, it has been found desirable to employ in the size about ½ to 2% by weight of an alkoxylated nitrogen compound reacted with a polycarboxylic acid and then reacted with an epoxide compound. This reaction product has been found to overcome a tendency of the polyurethane resin to throw-out and deposit as a solid on the sizing applicator, thereby causing breakage of the strand. The description and preparation of the reaction product is set forth in detail in a copending aplication assigned to applicant's assignee, U.S. Ser. No. 599,180.

The reaction product is preferably produced by reacting one mole of the alkoxylated nitrogen containing compound with two moles of a polycarboxylic acid. The resulting reaction product is then reacted with two moles of an epoxide compound, preferably a polyepoxide compound. In the above described reaction it is believed that one carboxyl group of each mole of the acid esterifies with one of the terminal hydroxyl groups of the alkoxylated nitrogen containing compound, thereby leaving two carboxyl groups available for further reaction. Each of these carboxyl groups is then esterified by reaction with an epoxy group of the epoxide compound.

The resulting reaction product has epoxy groups available for further reaction when polyepoxide compounds are employed in the reaction. It is also conceivable that the reaction product is composed in part of mixtures of cyclic compounds which might be formed during either the first or second reaction step.

The molecular weight of the reaction product is approximately 1,000 to 20,000. The molecular weight can be determined when a polyepoxide is employed as a reactant by determining the epoxy equivalent by the method of Durbetaki as set forth in Volume 28, No. 12, December 1956 of *Analytical Chemistry*. The molecular weight is then estimated to be about twice the epoxy equivalent. The epoxy equivalent of the reaction product ranges from about 500 to 10,000. The reaction products are waxy solids and are readily soluble or dispersible in one to three times their weight of water.

The alkoxylated amines and amines are commercially available materials which are produced by reaction of an alkylene oxide with a primary fatty amine or amide. The preparation of an alkoxylated amine is shown in U.S. Pat. No. 1,970,578, and the preparation of an alkoxylated amide is shown in U.S. Pats. Nos. 2,002,613, 2,085,706 and 2,520,381. The preparation of the alkoxylated amines (and the amine) can be accomplished by reacting one mole of the amide (or amine) with 2 to 200 moles of an alkylene oxide in the manner described in the patents. The reaction is usually carried out in an autoclave at a slightly elevated temperature. The alkoxy group can contain one to four carbon atoms, but is preferably ethoxy or propoxy. Representative structural formulas of the amine and amide are as follows:

(1) 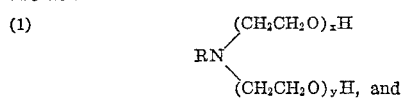

(2) 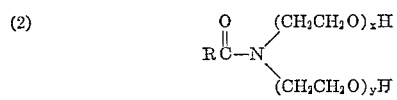

wherein R is a saturated or unsaturated, alkyl, aryl, arylalkyl or alkylaryl radical containing 6 to 18 carbon atoms and $x$ and $y$ are one to 100 or more. R may be substituted by hydroxy or halogen groups. For example, R may be stearyl, benzyl, oleyl, hydroxy stearyl, phenyl, lauryl, dimethyl phenyl, etc. The molecular weight of the alkoxylated amide or amine can vary roughly from 250 to 10,000.

Polycarboxylic acids which may be used in preparing the reaction product include, for example, oxalic, malonic, succinic, glutaric, adipic, pimelic, suberic, azelaic, sebacic, maleic, fumaric, itaconic, citraconic, mesaconic, muconic, 1,2-cyclohexanedicarboxylic, 1,4-cyclohexanedicarboxylic, malic, tartaric, phthalic, isophthalic, terephthalic, tetrahydrophthalic, tetrachlorophthalic and tricarballylic acids and the corresponding known acid anhydrides of the above acids. The term "acids" as used herein and in the claims shall include the acid anhydrides where they exist. For example, alkenyl succinic anhydride and alkyl succinic anhydride, maleic anhydride, phthalic anhydride and combinations thereof can be used. Mixtures of acids can be used in the reaction.

Polycarboxylic acids which may be used in preparing an intermediate polycarboxylic ester which contains more than two unesterified carboxyl groups include hemimellitic, trimellitic, trimesic, prehnitic, mellophanic, pyromellitic, benzene pentacarboxylic, mellitic, citric, aconitic and oxalocitraconic acids. Also included are the adducts, such as Diels-Alder adducts, of maleic, fumaric, chloromaleic, dichloromaleic, itaconic, citraconic, muconic, aconitic and oxalocitraconic acids, and their corresponding anhydrides where such exist, with conjugated and nonconjugated compounds such as rosin, rosin acids, linseed oil, linoleic acid, linolenic acid, eleostearic acid, tung oil, oiticia oil, soybean oil, dehydrated castor oil, alpha terpinene, allocimene, ocimene, myrcene, beta phellandrene and other like materials sometimes known as extenders.

A suitable epoxy compound is one which contains at least one group in which an oxygen atom is attached to adjacent carbon atoms

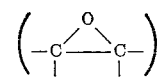

Such compounds are well known in the art and may be either monomeric or polymeric.

One group of polyepoxy compounds which may be used is obtained by the reaction of a stoichiometric excess of an epihalohydrin such as epichlorohydrin with a polyhydric phenol such as bis-(4-hydroxy phenyl)-2,2-propane, bis-(hydroxy phenyl) methane (obtained by the acid condensation of two moles of phenol with one mole of formaldehyde), hydroquinone, resorcinol, etc., or with a polyhydroxy alcohol such as glycol, polyethylene glycol, sorbitol, glycerol, etc. Such compounds are characterized by the presence of terminal epoxy groups. These compounds are further described in U.S. Pats. 2,324,483; 2,444,333; 2,494,295; 2,500,600 and 2,511,913 the disclosures of which are incorporated herein by reference. By varying the proportions of the epihalohydrin and the polyhydroxy compound, and/or by varying the reaction conditions, compounds of low, intermediate or higher molecular weights may be produced which range from liquids to solids. Some commercially available compounds of this type and their characteristics are listed below:

| Resin | Epoxide equivalent | Approximate molecular weight | Viscosity (poises) | Melting point (° C.) |
|---|---|---|---|---|
| Epon 812 | 140–160 | 306 | 1–2 | Liquid |
| Epon 826 | 180–188 | 360 | 65–95 | Liquid |
| Epon 828 | 192 | 390 | 100–160 | 8–12 |
| Epon 834 | 230–280 | 470 | 4–9 | 20–28 |
| Epon 1001 | 425–550 | 900 | Solid | 64–76 |
| Dow 331 | 186–192 | 390 | 111–140 | Liquid |
| Dow 2337 | 374–415 | 800 | 200 | Liquid |

Other polyepoxy compounds which may be used include epoxylated novolaks, epoxidized polyolefins, epoxidized polybutadiene and other epoxidized diene polymers, butadiene diepoxide, diglycidyl esters of dicarboxylic acid (e.g., diglycidyl phthalate), etc.

A preferred class of compounds which contains more than one epoxy group per molecule comprises diepoxy compounds containing at least one fused ring epoxy group, i.e., at least one of the epoxy groups being attached to adjacent carbon atoms which are located in a carbocyclic structure. Representative examples of such compounds and U.S. Patents which disclose these compounds are listed below. The disclosures of all of the cited U.S. Patents are incorporated herein by reference.

I. Compounds having the general formula:

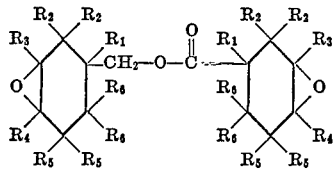

wherein $R_1$, $R_2$, $R_3$, $R_4$, $R_5$ and $R_6$ represent a hydrogen atom or an aliphatic hydrocarbon radical. Examples of such compounds, which are disclosed in United States Pat. No. 2,716,123, include 3,4-epoxycyclohexylmethyl-3,4-epoxycyclohexanecarboxylate;
3,4-epoxy-1-methylcyclohexylmethyl-3,4-epoxy-1-methylcyclohexanecarboxylate;
3,4-epoxy-2-methylcyclohexylmethyl-3,4-epoxy-2-methylcyclohexanecarboxylate;
3,4-epoxy-6-methylcyclohexylmethyl-3,4-epoxy-6-methylcyclohexanecarboxylate;
3,4-epoxy-3-methylcyclohexylmethyl-3,4-epoxy-3-methylcyclohexanecarboxylate; and
3,4-epoxy-4-methylcyclohexylmethyl-3,4-epoxy-4-methylcyclohexanecarboxylate.

II. Compounds having the general formula:

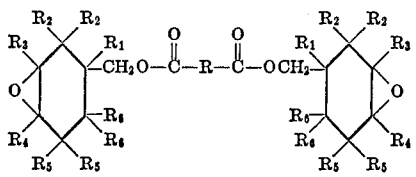

in which $R_1$, $R_2$, $R_3$, $R_4$, $R_5$ and $R_6$ represent a hydrogen atom or an alkyl radical and R represents a divalent aliphatic hydrocarbon radical. Examples of such compounds, which are disclosed in U.S. Pat. No. 2,750,395, include bis-(3,4-epoxycyclohexylmethyl) maleate;
bis-(3,4-epoxycyclohexylmethyl) pimelate;
bis-(3,4-epoxy-6-methylcyclohexylmethyl) maleate;
bis-(3,4-epoxy-6-methylcyclohexylmethyl) succinate;
bis-(3,4-epoxycyclohexylmethyl) terephthalate;
bis-(3,4-epoxycyclohexylmethyl) oxalate;
bis-(3,4-epoxycyclohexylmethyl) succinate; and
bis-(3,4-epoxy-6-methylcyclohexylmethyl) adipate.

III. Bis-epoxycyclopentanyl ether which has the formula:

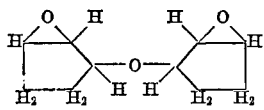

The preparation of this compound is disclosed in U.S. Pat. No. 2,739,161.

IV. Compounds having the general formula:

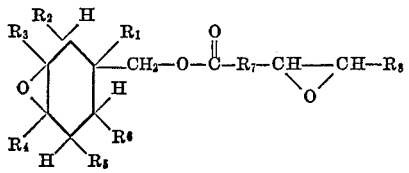

wherein the radicals $R_1$ through $R_6$ represent hydrogen atoms or alkyl groups, $R_7$ is an alkylene chain containing from 1 to 15 carbon atoms, and $R_8$ represents a hydrogen atom or an alkyl radical containing from 1 to 14 carbon atoms, the total number of carbon atoms in $R_7+R_8$ being from 7 to 15 carbon atoms. Examples of such compounds, which are disclosed in U.S. Pat. No. 2,786,066, include 3,4-epoxycyclohexylmethyl 9,10-epoxymyristate;
3,4-epoxycyclohexylmethyl 9,10-epoxypalmitate;
3,4-epoxycyclohexylmethyl 9,10-epoxystearate;
3,4-epoxy-1-methylcyclohexylmethyl 9,10-epoxystearate; and
3,4-epoxy-6-methylcyclohexylmethyl 9,10-epoxystearate.

V. Compounds having the general formula:

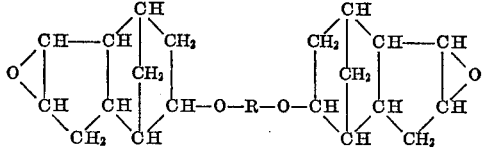

in which R is the radical of a glycol, HO·R·OH, such as ethylene glycol, or of a polyalkylene glycol, HO, R' O R' OH, such as diethylene glycol such as disclosed in U.S. Pat. No. 2,543,419.

VI. Compounds having the general formula:

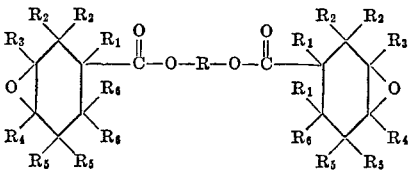

Such compounds are disclosed in U.S. Pats. 2,745,847; 2,853,498 and 2,853,499. Some specific examples of these compounds include ethylene glycol bis-(3,4-epoxycyclohexanecarboxylate);
3-methyl-1,5-pentanediol bis-(3,4-epoxycyclohexanecarboxylate);
1,5-pentanediol bis-(3,4-epoxycyclohexanecarboxylate);
1,6-hexanediol bis-(3,4-epoxycyclohexanecarboxylate);
2-methoxymethyl-2,4-dimethyl-1,5-pentanediol bis-(3,4-epoxycyclohexanecarboxylate);
diethylene glycol bis-(6-methyl-3,4-epoxycyclohexanecarboxylate);
diethylene glycol bis-(3,4-epoxycyclohexanecarboxylate); and
triethylene glycol bis-(3,4-epoxycyclohexanecarboxylate).

Other diepoxy compounds having at least one fused ring epoxy group include limonene diepoxide

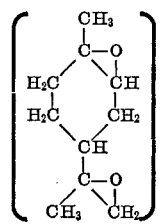

1,2,5,6-diepoxycyclooctane

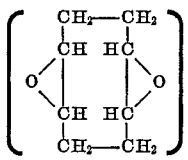

dicyclopentadiene diepoxide

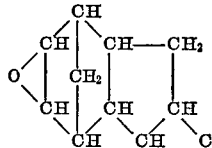

and vinylcyclohexene diepoxide

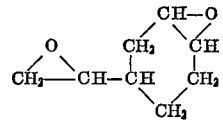

The reaction between the alkoxylated nitrogen containing compound and the polycarboxylic acid results in an intermediate reaction product having a molecular weight of approximately 300 to 11,000. The intermediate reaction product has an acid number of 20 to 300. The reactants are preferably reacted in a proportion of one mole of alkoxylated nitrogen containing compounds to two moles of polycarboxylic acid. Less than two moles of acid can be present, however, an excess of two moles should be avoided for the excess acid acts as an undesirable catalyst to gel the epoxy compound in the subsequent reaction.

The reaction between the epoxide compound and the ester of the polycarboxylic acid and the alkoxylated amine or amide can be conducted under various conditions. No catalyst is necessary to effect the reaction and it is preferred that none be present. However, the reaction proceeds more rapidly when heated. Proportions of reactants are not critical. It has been found convenient to use a least one mole of polyepoxide compound per unesterified carboxyl group per mole of the ester. When the reaction is carried out at elevated temperatures, i.e, 150 to 200° C., the reaction can be completed in a few minutes. Longer heating at these temperatures causes some additional reaction between oxirane groups and thereby causes the overall molecular weight of the reaction product to increase. For example, the reaction between the polyepoxy compound and the acid reaction product can proceed for 3 hours at 200° C. with only 10 to 50 percent increase in the overall molecular weight of the resulting reaction product. Some improvement in the twisting and handling of sized strand is noted with the higher molecular weight products, however, the increased cost of reaction over the longer period of time must be measured against the value of the improvement noted in the handling characteristics of the sized glass fiber strand. Limited heating at elevated temperatures provides a reaction product which is satisfactory for most applications of the sized yarn or roving.

The reaction product can be prepared according to the following procedure. The reactants are mixed in a three-necked flask fitted with a stirrer, a $CO_2$ bubbler, a water trap condenser and a thermometer. The alkoxylated amine or amide is first placed in the flask and the polycarboxylic acid is added to it with stirring. The reactants are heated to 200° C. and held at this temperature for about one hour. During this heating, $CO_2$ gas is bubbled through the reaction mixture. The reaction mixture is cooled to 150° C. and the epoxide compound is added to the reaction mixture. The mixture is then heated to a temperature of 200° C. over a period of 10 to 15 minutes. The reaction mixture is then cooled to about 100° C. and poured into about one to three times its weight of water to form either a solution or dispersion of the product. The ingredients are listed below on a weight basis and a mole basis.

REACTION PRODUCT X

| Reactants | Molar ratio | Weight (grams) |
|---|---|---|
| 1. Ethoxylated stearyl amine having an average molecular weight of 2,470 (Ethomeen 18/60 sold by Armour and Company) | 1 | 988 |
| 2. Phthalic anhydride | 2 | 118.5 |
| 3. Epon 826 epoxy resin | 2 | 288 |

The reaction product has an epoxide equivalent of about 1390 and an average molecular weight of about 2800. It is a solid at room temperature and readily soluble in one to three times its weight of water.

A lubricant is employed as a desirable ingredient in the size. The emulsifier may serve as the lubricant as well as the emulsifying agent, but usually a conventional lubricant or softener for glass fiber forming sizes is included in the size. A typical material which can be used as a lubricant, sometimes called a glass fiber softener, is a cationic active, acid solubilized, fatty acid amide. A suitable material is the pelargonic acid amide of tetraethylene pentamine, which is manufactured by Imperial Chemical Industries and sold under the trademark Cirrasol-185. It is an anhydrous material which is a deep reddish, amber, viscous liquid at room temperature. It is water dispersible and has a pH of 8.9 to 9.4 in a one percent by weight aqueous dispersion. Other commercially available acid solubilized, fatty acid amides are useful as textile softeners in the practice of the invention. These include fatty acid amides wherein the acid group contains from 4 to 24 carbon atoms. Also included are anhydrous, acid solubilized polymers of the lower molecular weight, fatty acid amides. The textile softener or lubricant is employed in an amount approximately 0.1 to 1 percent by weight of the sizing solution.

Another glass fiber softener and lubricant which can be used in the size is an alkyl imidazoline derivative which includes compounds of the class U-alkyl N-amidoalkyl imidazolines which may be formed by causing fatty acids to react with polyalkylene polyamines under conditions which produce ring closure. The reaction of tetraethylene pentamine with stearic acid is exemplary of such reaction. These imidazolines are described more fully in U.S. Pat. No. 2,200,815. Other suitable imidazolines are described in U.S. Pats. Nos. 2,267,965; 2,268,273 and 2,355,837.

The total non-aqueous content of the size is about 5 to 25 percent by weight of size. In any event, the amount of the various ingredients should not exceed that amount which will cause the viscosity of the size to be greater than about 100 centipoises at 20° C. Sizes having a viscosity of greater than 100 centipoises at 20° C. are very difficult to apply to glass fiber strands during their formation without breaking the strand. It is preferred that the viscosity of the size be 100 centipoises or below at 20° C. for best results. Typical examples of the size are as follows:

EXAMPLE I (A) Preparation of the prepolymer.—469 grams of water free condensate of one mole of 2,2-methylene bis (para octyl phenol) with two moles of ethylene oxide is dissolved in 231 grams of xylene. This solution is added dropwise to a solution consisting of 308 grams of toluene diisocyanate (80% by weight of the 2,4 isomer and 20% by weight of the 2,6 isomer) dissolved in 105 grams of xylene while maintaining the temperature at about 80° C. After all of the solution containing the condensate is added, the temperature of the mixture is maintained at about 80° C. for two hours until an isocyanate content of 9.4% determined by titration with di-n-butyl amine is reached. This indicates that all the free hydroxyl has reacted with the toluene diisocyanate to form a prepolymer. Upon cooling to room temperature, an amber solution is obtained.

(B) Formation of the adduct.—1,089 grams of the amber prepolymer solution prepared above are added to a solution of 197 grams of caprolactam dissolved in 84 grams of xylene. After all of the prepolymer has been added, the clear resulting solution is heated to about 80° C. This temperature is maintained for a period of about four hours. Upon cooling to room temperature, this system remains a clear solution. A small sample of this solution is titrated with n-dibutylamine which indicates that no free isocyanate groups are present in the resulting prepolymer caprolactam product. This test indicates that a caprolactam and isocyanate terminated prepolymer reacts to form an adduct.

(C) Formation of the resin.—2000 grams of polyoxyethylene glycol (molecular weight—1000) are added to the adduct formed in (B).

(D) Preparation of the size.—The following ingredients are mixed to form the aqueous size:

Ingredient: Parts by weight
1. Polyurethane resin and solvent produced as in (C) above _____ 800
2. Non-ionic emulsifying agent Pluronic F-108 (a condensate having a molecular weight of about 16,000) formed by condensing propylene oxide with propylene glycol _____ 50
3. Gamma, aminopropyltriethoxysilane _____ 9100
4. Water _____ 9100

The emusifying agent is dissolved in the resin and solvent solution. Water is then added to form an oil in water emulsion of the resin. The amino silane is dissolved in water and this solution is added finally to the resin emulsion.

EXAMPLE II (A) Preparation of the prepolymer.—247 grams of water-free Pluracol TP-740 (0.33 mole of a polypropylene oxide adduct of trimethylol propane having an average molecular weight of 741) is dissolved in 280 grams of a mixture comprising 50% by weight Cellosolve acetate and 50% by weight xylene. This solution is added dropwise to 174 grams (1.0 mole) of toluene diisocyanate (80% by weight of the 2,4 isomer and 20% of the 2,6 isomer) containing 5 drops of o-chlorobenzyl chloride in a moisture-free nitrogen atmosphere while maintaining the temperature of this mixture at about 45° C. After all of the polypropylene glycol is added, the temperature of the mixture is raised to 80° C. This temperature is maintained for two hours. Upon cooling to room temperature, a colorless solution is obtained. Analysis of a sample of this prepolymer solution by titration with n-dibutylamine indicates an isocyanate content of 5.99%. This indicates that approximately the theoretical amount of isocyanate has reacted with the glycol to form prepolymer.

(B) Formation of the adduct.—100 grams of the clear prepolymer solution prepared above are added to a solution of 15.1 grams of caprolactam dissolved in 10 grams of Cellosolve acetate. After all the prepolymer has been added, the clear resulting solution is heated to 80° C. This temperature is maintained for a period of about ten hours. Upon cooling to room temperature, this system remains a clear solution. A small sample of this solution is titrated with n-dibutylamine which indicates that no free isocyanate groups are present in the resultant prepolymer caprolactam product. This test indicates that a caprolactam and isocyanate terminated prepolymer reacts to form an adduct.

(C) Formation of the resin.—206 grams of diethylene triamine are added to the adduct formed in (B).

(D) Preparation of the size.—The following ingredients are mixed to form the aqueous size:

Ingredient: Parts by weight (pounds)
1. Polyurethane resin emulsion:
   a. Polyurethane from (C) above __ 24
   b. Cellosolve acetate/xylene (50/50) _____ 12   } 63.0
   c. Non-ionic emulsifying agent __ 1.8
   d. Water _____ 25.2
2. Reaction Product X _____ 2.36
3. Gamma aminopropyltriethoxysilane _____ 3.15
4. Water _____ Remainder Fifteen gallons of cold water is added to a main mixing tank. The emulsifying agent is dissolved in the resin solution and sufficient water is added to form an emulsion of the resin. The emulsion is slowly added to the water in the tank. Reaction Product X is added to 10 gallons of water and this is added to the main mixing tank. The silane is added to 2 gallons of water and this mixture is next added to the main mixing tank. This resultant mixture is then diluted with sufficient water to form 50 gallons of size. The resultant size contains 7.8±0.2 solids.

EXAMPLE III

The size of Example II is modified by adding 357 grams of a pelargonic acid amide of tetraethylene pentamine to about 3 gallons of water and adding this mixture to the main mixing tank just prior to the addition of the amino silane as well as substituting for the polyurethane resin a caprolactam-blocked polyurethane resin with a polyol curing agent (produced by Nopco Chemical Company identified as D-609).

The sizes described in Examples I, II, and III are applied to the individual glass fibers during their formation in the manner illustrated in U.S. Pat. No. 3,168,389. The size is applied to the individual fibers just after their emergence from orifices in an electrically heated, platinum alloy bushing containing molten glass. The size is applied to the filaments prior to the time they are grouped together to form a strand by means of a roller applicator such as shown in U.S. Pat. No. 2,728,972. The sized fibers are grouped into a strand and wound around a forming tube rotating at approximately 7500 r.p.m. to produce a strand travel of approximately 12,000 to 15,000 feet per minute. Other methods of applying the size to the strand of glass fibers, such as a pad applicator or belt applicator, may be employed and the strand may be formed by means other than winding on the forming tube, such as by means of a pair of rotating wheel pullers which direct the strand into a suitable collecting device.

The glass fiber strands wound on the forming tube or otherwise produced are then heat treated. This may be done by heating them at a temperature and for a length of time sufficient to remove substantially all of the solvent and the water, for example, at about 275° F. for 8 hours and split off the end-blocking amide in the polyurethane resin. When the amide is split off, the polyurethane cures to form a stronger binder film on the strand. This heating also causes the coupling agents to fix themselves to the glass surface. The heating produces the degree of strand integrity and hardness required for chopping the strand as such or chopping it in roving form to produce chopped strand. The solids content of size on the strand averages about 0.5 to 2.5 percent by weight, preferably about 1.5 to 2 percent by weight, based upon the weight of the sized strand.

The maintenance of the strand integrity and compatibility of the sized strand with polyamide resins is evidenced by the high strengths obtained from injection molded parts prepared and tested as follows:

EXAMPLE IV

Chopped strands, ⅛ inch in length, sized with the size of Example III are blended in a tumbler mill with particles of a nylon-6,6 resin. The mixture contains 30% by weight of glass fibers based upon the weight of the mixture. The mixture is then injection molded in conventional injection molding equipment to form samples suitable for standard ASTM strength tests. The molding is done at a temperature of 550° F. at a pressure of 1800 pounds per square inch. The samples are not discolored.

The glass fiber strands are made up of 400 filaments having an average diameter of 0.00036 inches per filament. The glass is composed of conventional E-glass such as disclosed in U.S. Pat. No. 571,074, such glass consisting of in percent by weight of 54 percent $SiO_2$, 22 percent CaO, 14 percent $Al_2O_3$ and 10 percent $B_2O_3$.

The following test results are observed upon testing suitable strips according to the specified ASTM procedures. The results obtained using the invention are listed under polyurethane and are compared with similar samples wherein the glass fiber used in the test are sized with a polyvinyl acetate latex binder or an acrylic latex binder.

TABLE I

| Test | Results | | |
|---|---|---|---|
| | Polyurethane | Polyvinyl acetate | Acrylic latex |
| Tensile strength (pounds per square inch) ASTM Test No. D-638-52T | 26,000 | 14,700 | 19,000 |
| Flexural strength (pounds per square inch) ASTM Test No. D-790-49T | 42,700 | 28,500 | 29,400 |
| Unnotched Izod Impact (foot pounds per inch) Test uses cantilever beam (Izod type) impact machine illustrated in ASTM Test No. D-256-54T, sample mounted vertically; clamped only at bottom | 21.77 | (¹) | (¹) |

¹ No test result.

The invention is applicable to the reinforcement of a variety of polyamide resins. These include those commonly known as nylon-6,6 and nylon made from caprolactam.

A size including a mixture of caprolactam blocked toluene-diisocyanate and a fully cured polyurethane as an aqueous emulsion in a ratio of from about 2 parts blocked to 1 part cured resin to 1 part blocked to 2 parts cured resin is found to provide superior strengthening of polyphenyl oxide resins and blends of polyphenyl oxide with other resins such as polystryene (e.g., resins such as sold under the mark "Noryl" by General Electric Co.). The following example illustrates the use of a size further including a portion of cured polyurethane.

EXAMPLE V

Samples are prepared and tested as in Example IV except for use of a size having the following composition to make five gallons of an aqueous size.

| | Grams |
|---|---|
| Caprolactam blocked toluene diisocyanate | 872.5 |
| Cured polyurethane resin | 872.5 |
| Epoxy resin indicated above as Reaction Product X | 651 |
| Gamma-aminopropyltriethoxy-silane | 87 |
| Lubricant-cationic active, fatty acid amide | 22 |

In this example the caprolactam blocked diisocyanate is a polyurethane emulsion sold by Nopco Chemical Co. under the name and designation Noxco D-609; the cured polyurethane is an emulsion sold by Wyandotte Chemical Co. under the name and designation X-1033; and the lubricant is a cationic active, fatty acid amide sold by Emery Industries under the name and designation Emerylube.

The following test results are observed upon testing suitable test strips according to the specified ASTM procedures. The results obtained for "Noryl" resin reinforced with the sized glass fibers of this invention are compared with a control having the glass fibers sized with a size employing polyester resin in place of the polyurethane of the size of this invention.

TABLE II

| Test | Results | | | |
|---|---|---|---|---|
| | 1 | 2 | 3 | Control |
| Tensile strength (pounds per square inch) ASTM Test No. D-638-52T | 13,600 | 17,700 | 18,700 | 10,500 |
| Flexural strength (pounds per square inch) ASTM Test No. D-790-49T | 19,000 | 23,200 | 24,400 | 18,700 |
| Flexural modulus (pounds per square inch×10⁵) | 7.3 | 7.8 | 8.0 | 5.8 |
| Notched Izod Impact (foot pounds per inch) ASTM Test No. D-256-54T | 1.6 | 1.8 | 2.3 | 1.5 |

From the above example it is apparent that the strength of glass fiber reinforced polyphenylene oxide resinous articles is particularly enhanced by sizing the glass according to this particular embodiment of the present invention.

It has further been observed that where the particular polyurethane employed in the size of this invention is an aliphatic polyurethane that degradation of the polyurethane in a matrix of nylon is substantially reduced. Degradation of a polyurethane is observable as a yellowing of the material after prolonged exposure to ultraviolet light.

EXAMPLE VI

Reinforced nylon 6,6 samples are prepared as in the example above except that the polyurethanes of that example are replaced with an equal amount of an aliphatic polyurethane, dicyclohexylmethane 4,4'-diisocyanate sold by Nopco Chemical Co. under the name and designation of "Nopco" 25D. Several samples so prepared are exposed to an ultraviolet light source emitting radiation having a wavelength of about 3660 Angstroms (e.g., Blak-Ray Ultraviolet lamp, Model UVL-22, Cat. No. 11-984-1). Other samples are exposed to a sunlamp emitting radiation below 3800 Angstroms with a power of 7.7 watts and between 3800 and 7600 Angstroms with a power of 45 watts (e.g., Sunlamp, Model S-1 sold by General Electric).

Discoloration over time is visually observed. Samples prepared with aliphatic polyurethane size and samples prepared with an aromatic polyurethane size are initially light gray, Color No. 264. After only four hours exposure to the ultraviolet light the aromatic polyurethane sized materials are discolored to dark gray-yellow, Color No. 91, and further exposure does not significantly darken the samples. After 24 hours exposure the samples prepared with aliphatic polyurethane are only slightly discolored to gray-green-yellow, Color No. 105, and appear stable at this color. After 24 hours exposure to the sunlamp samples prepared with aromatic polyurethanes are discolored to dark grey-yellow, Color No. 91, and after 24 hours exposure to the sunlamp samples prepared with aliphatic polyurethane are slightly affected, being grey-green-yellow, Color No. 105. All colors are according to the ISCC–NBS Color Name Charts as described in National Bureau of Standards Circular 553.

Although the present invention has been described with respect to specific details of certain embodiments thereof, it is not intended that such details act as limitations upon the scope of the invention except in so far as set forth in the accompanying claims.

We claim:

1. A method of forming a glass fiber strand which can be chopped and mixed with a polyamide resin for injection molding of reinforced polyamide resin articles which comprises drawing glass streams through orifices in a bushing to form individual glass filaments, moving the filaments away from the bushing at a high rate of speed and forming them into a strand, applying to the filaments, while they are moving at this speed, an aqueous size consisting, in percent by weight, essentially of:
   (a) 3 to 9 percent of an aqueous emulsion of a curable blocked polyurethane resin prepared by reacting a polyisocyanate with at least one of the compounds selected from the group consisting of hydroxy polyesters and polyethers and having an isocyanate to hydroxy equivalent ratio of at least about 2:1 and blocking the isocyanate groups with an end blocking compound containing active hydrogen atoms, and a curing agent therefor;
   (b) 20 to 50 percent of a nonreactive organic solvent for said polyurethane resin based upon the weight of the resin and solvent;
   (c) 1 to 4 percent of a nonionic emulsifying agent; and
   (d) 0.2 to 1 percent of an amino silane coupling agent; said size containing 5 to 25 percent nonaqueous ingredients and having sufficient water to provide a viscosity of less than 100 centipoises at 20° C.; and drying the glass fibers so treated.

2. Glass fiber strands formed by the method of claim 1.
3. A polyamide resinous article reinforced with the glass fiber strands described in claim 2.

References Cited
UNITED STATES PATENTS

| | | | |
|---|---|---|---|
| 3,045,036 | 7/1962 | Jex et al. | 260—448.2 |
| 3,248,259 | 4/1966 | Boresellino et al. | 117—139.5 |
| 3,323,975 | 6/1967 | Marzocchi et al. | 65—3 |
| 3,373,049 | 3/1968 | Nitzsche et al. | 65—126 GB |
| 3,459,585 | 8/1969 | Killmeyer et al. | 260—835 |
| 3,491,051 | 1/1970 | Elkin et al. | 260—29.6 |

ROBERT L. LINDSAY, JR., Primary Examiner

U.S. Cl. X.R.

117—126 GB; 260—29.2 TN

UNITED STATES PATENT OFFICE
CERTIFICATE OF CORRECTION

Patent No. 3,814,592　　　　　　　　　　Dated  June 4, 1974

Inventor(s) Donald E. McWilliams, Charles W. Killmeyer and George E. Eilerman

It is certified that error appears in the above-identified patent and that said Letters Patent are hereby corrected as shown below:

Column 1, line 39, "3,133,238" should be --2,133,238--; Column 4, first formula, at the end thereof "-n" should be --4-n--; Column 4, line 74, "aplication" should be --application--; Column 5, line 30, "amines" (second occurrence) should be --amides--; Column 8, second formula, "$R_1$" in the lower righthand section should be --$R_6$--; and Column 11, line 10, "9100" should be --50--.

Signed and sealed this 29th day of October 1974.

(SEAL)
Attest:

McCOY M. GIBSON JR.　　　　　　　　　C. MARSHALL DANN
Attesting Officer　　　　　　　　　　Commissioner of Patents